(No Model.)
J. T. WARREN.
Horse-Power Equalizer.
No. 228,576. Patented June 8. 1880.
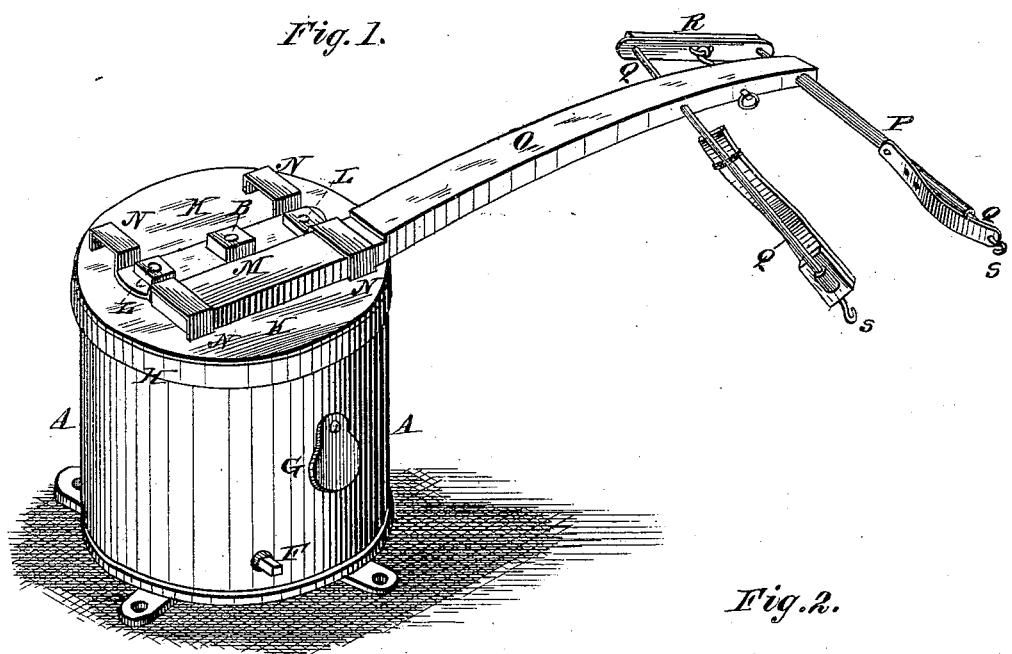
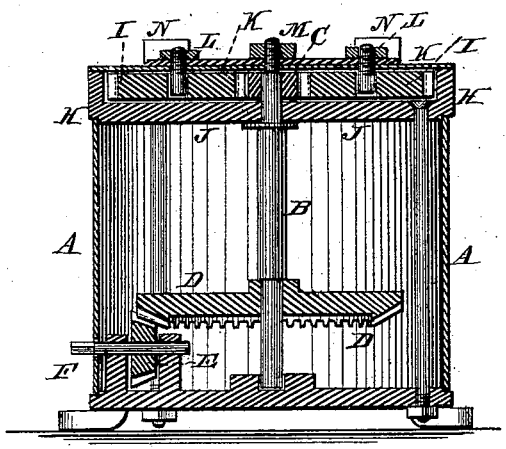
Witnesses:
J. W. Littell
F. Dietrich
Inventor:
J. T. Warren
by C. A. Snow & Co.
Attorneys.

UNITED STATES PATENT OFFICE.

JABEZ T. WARREN, OF LE ROY, NEW YORK.

HORSE-POWER EQUALIZER.

SPECIFICATION forming part of Letters Patent No. 228,576, dated June 8, 1880.

Application filed April 22, 1880. (No model.)

*To all whom it may concern:*

Be it known that I, JABEZ T. WARREN, of Le Roy, in the county of Genesee and State of New York, have invented certain new and useful Improvements in Horse-Power Equalizers; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a vertical sectional view, and Fig. 3 is a top-plan, the covering-plate having been removed.

Corresponding parts in the several figures are denoted by like letters of reference.

This invention relates to horse-powers; and it consists in certain improvements in the construction of the same, which will be hereinafter fully described, and particularly pointed out in the claim.

In the drawings, A represents a drum or casing, centrally in which is journaled a vertical shaft, B, carrying a pinion, C, and a bevel-wheel, D, which latter engages a pinion, E, upon the shaft F, which extends through the sides of the casing, so as to enable it to be connected with the tumbling-rods or other means for transmitting the power.

The parts D E are inclosed in the casing, which is provided with a hand-hole, G, affording access to the interior, for the purpose of lubricating the bearings, &c.

The drum or case A is provided at its upper end with a rim, H, toothed upon its inner side, as shown, and engaging two loose pinions, I I, arranged on opposite sides of and engaging the pinion C. The pinions I I are supported upon a diaphragm or horizontal partition, J.

The cover K of the casing is provided with two downward-projecting studs or pins, L L, which enter central perforations in the pinions I I, which may thus be operated by rotating the cover. For this purpose the latter is journaled upon the central shaft, B, upon which it is held by a nut, M.

Upon its upper side the cover K is provided with bails or clips N, to receive the sweeps O. The latter are provided with thills P P, formed of metallic tubing, such as gas-pipe, only one of which is shown.

Q Q are rods passing through the tubular thills and connected on the opposite side of the sweep with the whiffletree or evener R. The rod Q on the inner side of the evener is shown without the gas-pipe covering, to better illustrate the construction. The ends of the rods Q are provided with trace-hooks S S, to which the horse is to be hitched.

In practice the horse is hitched to the ends of rods Q, with his face toward the evener and sweep, which latter serves to guide the horse. By this arrangement the draft upon the sweep is more direct and less oblique than by the ordinary method of hitching, and the result is a considerable gain of power.

My improved horse-power is simple, inexpensive, and durable, the working parts being entirely covered and protected. Accidents by being caught in the gearing are also avoided.

Having thus described my invention, I claim and desire to secure by Letters Patent of the United States—

The combination, with a horse-power, of a sweep, O, having tubular thills P, rods Q, and evener R, substantially as and for the purpose set forth.

In testimony that I claim the foregoing as my own I have hereto affixed my signature in presence of two witnesses.

JABEZ T. WARREN.

Witnesses:
ANGUS L. TOMPKINS,
CHARLES W. MESERVE.